(12) United States Patent
Watanabe

(10) Patent No.: US 6,788,954 B1
(45) Date of Patent: Sep. 7, 2004

(54) CELLULAR PHONE TERMINAL

(75) Inventor: Tadayuki Watanabe, Kanagawa (JP)

(73) Assignee: Kyocera Corporation (JP)

( * ) Notice: Subject to any disclaimer, the term of this patent is extended or adjusted under 35 U.S.C. 154(b) by 337 days.

(21) Appl. No.: 09/706,985

(22) Filed: Nov. 6, 2000

(30) Foreign Application Priority Data

Nov. 9, 1999 (JP) .......................................... 11-318810

(51) Int. Cl.$^7$ ............................ H04M 3/42; H04M 1/00
(52) U.S. Cl. ................................ 455/550.1; 455/414.1; 455/414.3
(58) Field of Search ................................. 455/414–419, 455/550, 575, 550.1, 95, 208

(56) References Cited

U.S. PATENT DOCUMENTS

| 4,649,567 A | * | 3/1987 | Childress ..................... 455/17 |
| 4,716,576 A | * | 12/1987 | Sakai et al. .................... 375/31 |
| 4,982,441 A | * | 1/1991 | Hashimoto et al. ........... 455/34 |
| 5,524,135 A | * | 6/1996 | Mizikivsky et al. .......... 379/58 |
| 5,884,193 A | * | 3/1999 | Kaplan ........................ 455/565 |

FOREIGN PATENT DOCUMENTS

JP          3246641      * 11/1991      .......... G06F/11/34

* cited by examiner

*Primary Examiner*—William Trost
*Assistant Examiner*—Meless Zewdu
(74) *Attorney, Agent, or Firm*—Schulte Roth & Zabel; Joel E. Lutzker; John C. Garces

(57) ABSTRACT

A cellular phone terminal capable of setting a specific service by merely operating keys, the cellular phone terminal includes an input means 11 for inputting key-inputted data for setting the service, a radio state acquisition means 12 for obtaining a radio state upon setting the service, a time measuring means 13 for measuring generation timing of the key-inputted data, and a state recording memory 20 for storing the key inputted data information, the radio state information and key-inputted data interval information.

6 Claims, 4 Drawing Sheets

| RADIO STATE | RECORDING INFORMATION |
|---|---|
| IDLE | Ka1 \| Ka2 \| Ka3 ····· ORIGINATING KEY |
| ORIGINATING | ORIGINATING |
| TALKING | t1 \| Kb1 \| t2 \| Kb2 ····· tn \| ON-HOOK KEY |

FIG. 3

| RADIO STATE | RECORDING INFORMATION |
|---|---|
| IDLE | Ka1 \| Ka2 \| Ka3 ····· ORIGINATING KEY |
| ORIGINATING | ORIGINATING |
| TALKING | t1 \| Kb1 \| t2 \| Kb2 ····· Kbn \| tn |

FIG. 4

CELLULAR PHONE TERMINAL

BACKGROUND OF THE INVENTION

The present invention relates to a cellular phone terminal and, more particularly, relates to a cellular phone terminal capable of setting particular services by merely operating keys.

In recent years, the widely spread cellular phone terminals such as portable telephones etc. are provided with many functions such as an answering service or a telephone message recording service, a call forwarding service or a telephone redirecting service etc. capable of setting services by merely operating keys.

In the case of setting such services, key-inputted data of the services set by the key operation is stored in a sequential order, and then the key-inputted data thus stored is read by pushing a predetermined service start key thereby set the services.

When setting the services only based on the key-inputted data from a key board, there arises a case that the input operation of the key board can not necessarily be replicated accurately. In order to improve such a problem, there has been known a method that, for example, time (timing) where data is inputted from the key board is measured together with the key-inputted data, and time interval information relating to key inputting operation is recorded together with the key-inputted data thereby to accurately replicate the inputting operation of the key board.

As such a method of recording the inputting operation of the key board, there is known a technique disclosed in JP-A-3-246641.

However, when applying the inputting operation method of the key board described in the aforesaid publication to the cellular phone terminal, there arises a problem that the expected operation can not be replicated necessarily.

That is, in the cellular phone terminals, the setting services to be executed may include an originating operation to send setting information to a service provider. When setting and replicating such a service, the time period required for connecting to the destination or called subscriber may differ depending on the radio state of the electric wave, so that there arises a problem that the service cannot necessarily be replicated when replicating only based on the key-inputted data and the time interval information relating to key inputting operation.

Further, in this case, there arises another problem that an amount of data to be recorded for setting the service becomes much.

SUMMARY OF THE INVENTION

Accordingly, the invention has been made in order to solve the aforesaid problems of the prior art, and an object of the present invention is to provide a cellular phone terminal which can stably and automatically set services capable of being set by merely operating keys.

The invention is arranged in a manner that in a cellular phone terminal capable of setting a specific service by merely operating keys, the cellular phone terminal includes an input means for inputting key-inputted data for setting the service, a radio state acquisition means for obtaining a radio state upon setting the service, a time measuring means for measuring generation timing of the key-inputted data, and a state recording memory for storing the key inputted data information, the radio state information and key-inputted data interval information. In the cellular phone terminal, the information to be stored in the state recording memory can be selected in accordance with the radio state.

Further, in the cellular phone terminal according to the invention, one of an idle state, an originating state and a talking state can be set as the radio state.

Furthermore, in the cellular phone terminal according to the invention, the information stored in the state recording memory can be read in accordance with the radio state thereby to execute the specific service having been set.

BRIEF DESCRIPTION OF THE PREFERRED EMBODIMENTS

FIG. 3 is a diagram showing the relation between radio states and recorded information when an on-hook key is pushed to terminate the recording operation;

FIG. 4 is a diagram showing the relation between radio states and recorded information when the recording operation terminated due to the disconnection on the network side;

DETAILED DESCRIPTION OF THE PREFERRED EMBODIMENTS

The embodiment of the invention will be explained with reference to the accompanying drawings.

Figure 1:
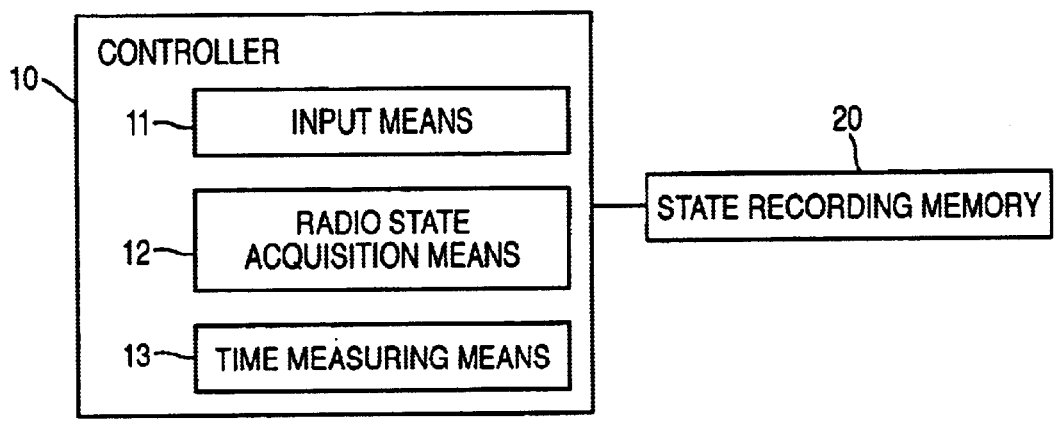
FIG. 1 is a block diagram showing the arrangement of the cellular phone terminal according to the invention.

FIG. 1 is a block diagram showing the arrangement of the cellular phone terminal according to the embodiment of the invention, which is formed by a control unit 10 and a state recording memory 20.

The control unit 10 includes therein an input means 11, a radio state acquisition means 12 and a time measuring means 13. The information acquired from these respective means is stored in the state recording memory 20.

The input means 11 inputs key-inputted data for setting particular services from a keyboard. The radio state acquisition means 12 obtains a radio state upon setting the service. For example, in the portable telephone, the radio state acquisition means specifies one of a "idle" state, an "originating" state and a "talking" state as the radio state.

The time measuring means 13 measures the generation timing of the key-inputted data inputted by the input means 11 thereby to measure the data interval of the respective key-inputted data inputted by the input means 11.

Figure 2:
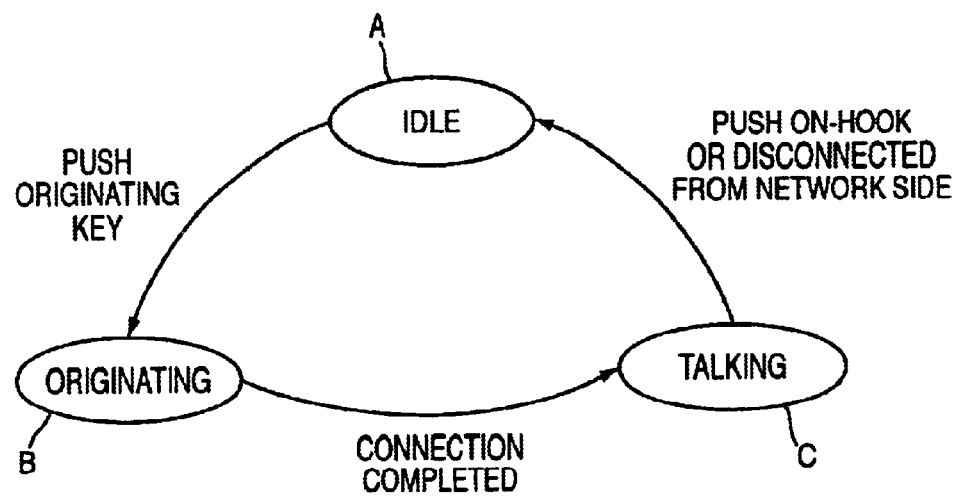
FIG. 2 is a diagram showing the state transition of radio states in the invention.

FIG. 2 is a diagram for explaining the radio states of the cellular phone terminal, wherein the aforesaid three states are defined.

These three radio states are "an idle" state A representing that the cellular phone terminal is now waiting a call, an "originating" state B representing that the cellular phone terminal is now originating a call and a "talking" state C representing that the cellular phone terminal has been connected to the network and is placed in a state capable of talking.

When an originating key is pushed in the "idle" state A, the status shifts to the "originating" state B. Further, when the connection to the network is completed in the "originating" state B, the status shifts to the "talking" state C. Furthermore, when an on-hook key or a call release key is pushed or the connection is disconnected on the network side in the "talking" state C, the status shifts to the "idle" state A.

The cellular phone terminal according to the invention performs the two operations, that is, a "recording" operation for setting the services and a "replicating" operation for replicating the services thus set.

Then, the explanation will be made as to the "recording" method for setting the services.

In the "recording" operation, the services are set actually thereby to record input information, input interval time information and radio state information upon each setting of the services. The contents to be recorded are changed depending on the radio state.

Thus, the contents of recorded information depending on the radio state shown in FIG. 2 will be explained.

As explained above, the three states of the "idle", "originating" and "talking" states are defined as the radio states, and the state transition among these states is shown in FIG. 2.

The contents to be recorded upon setting the service change depending on the radio state in the following manner.

FIGS. 3 and 4 show the relation between the radio states and the recorded information corresponding thereto. FIG. 3 shows an example in the case where the on-hook key is pushed and the recording operation is terminated, and FIG. 4 shows the case where recording operation is terminated due to the disconnection on the network side.

Figure 5:
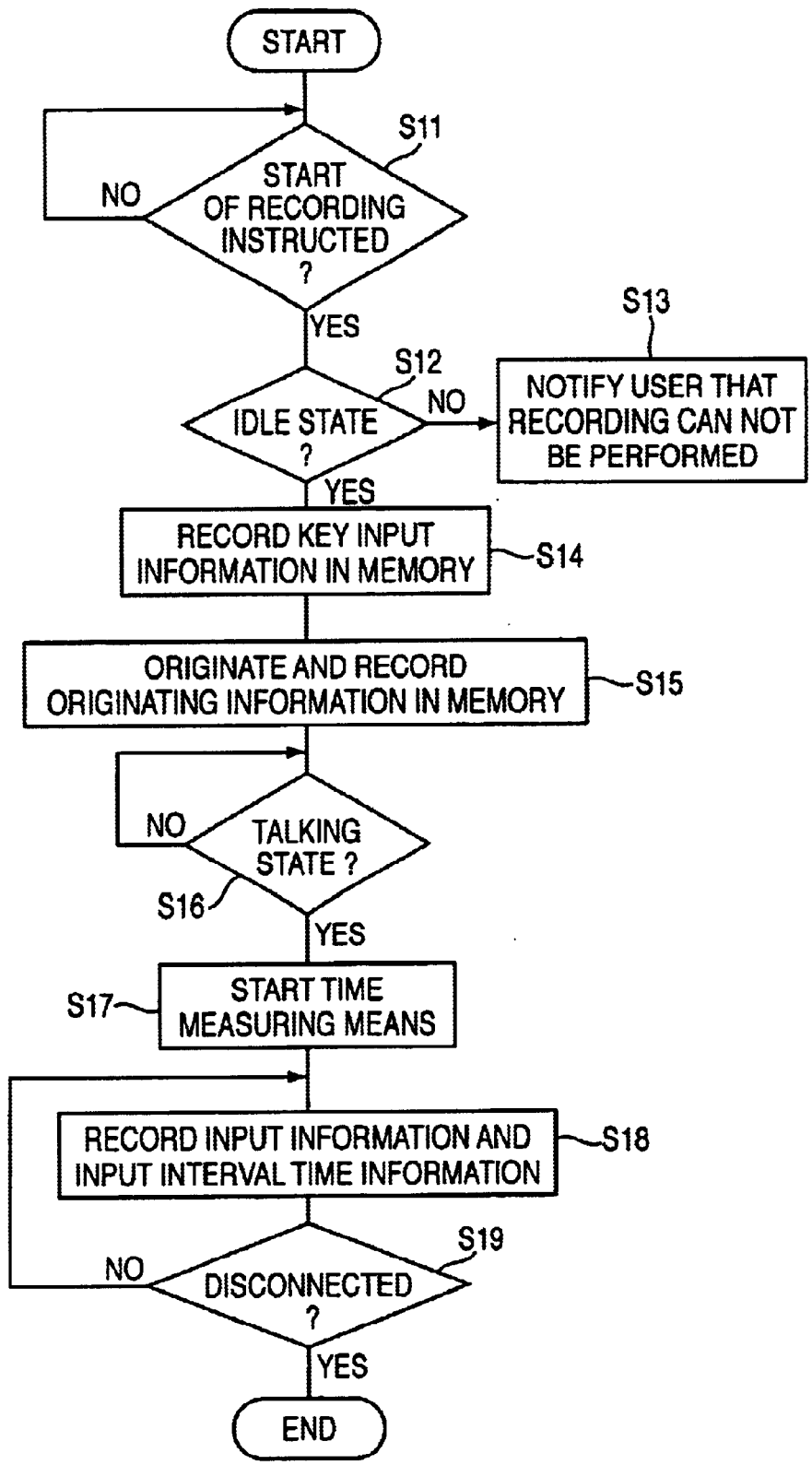
FIG. 5 shows a flow chart of the recording operation according to the embodiment of the present invention.

FIG. 5 shows a flow chart of the recording operation according to the embodiment of the present invention. First, in the "idle" state, the recording operation is started when the start of the recording is instructed (S11). That is, the recording operation is started either when a specific key for setting the service is pushed or when such an operation is performed that the start of the recording upon setting the service is selected by using a function key or a menu. When starting the recording operation, it is confirmed whether or not the radio state is the idle state by the radio state acquisition means 12 (S12). In this case, if the radio state is not the "idle" state, a user is notified that the recording operation can not be performed by using a message display, alarm sound, lighting of an LED etc., and the operation is terminated (S13).

In this case, the contents to be recorded in the state recording memory 20 as the recorded information is only the key-inputted data inputted by the input means 11 (S14).

The recording operation in the "idle" state is continued until the originating key is pushed. That is, as shown in FIG. 3 or 4, the input information Kax (x=1, 2, - - - , n) and the information representing the pushing of the originating key is recorded and held in the state recording memory 20.

When the radio state is shifted into the "originating" state in response to the pushing of the originating key, the radio state acquisition means 12 determines that the radio state is the originating state and records the information representing the originating state into the state recording memory 20 (S15) Then, the terminal is placed in a standby state until the radio state acquisition means 12 determines that the radio state is the state capable of communicating, that is, recognizes the state capable of communicating (S16).

Then, in the "talking" state, the time measuring means 13 is started and operated (S17), and both the input information inputted from the input means 11 and the input interval time information measured by the time measuring means 13 is recorded in the state recording memory 20. (S18) In this respect, tx (x=1, 2, - - - , n) represents the input interval time information.

In this case, the recording operation in the talking state is continued until the on-hook key is pushed or the connection is disconnected on the network side (S19), whereby both the input information Kbx and the input interval time information tx during the talking state is recorded in the state recording memory 20.

Figure 6:
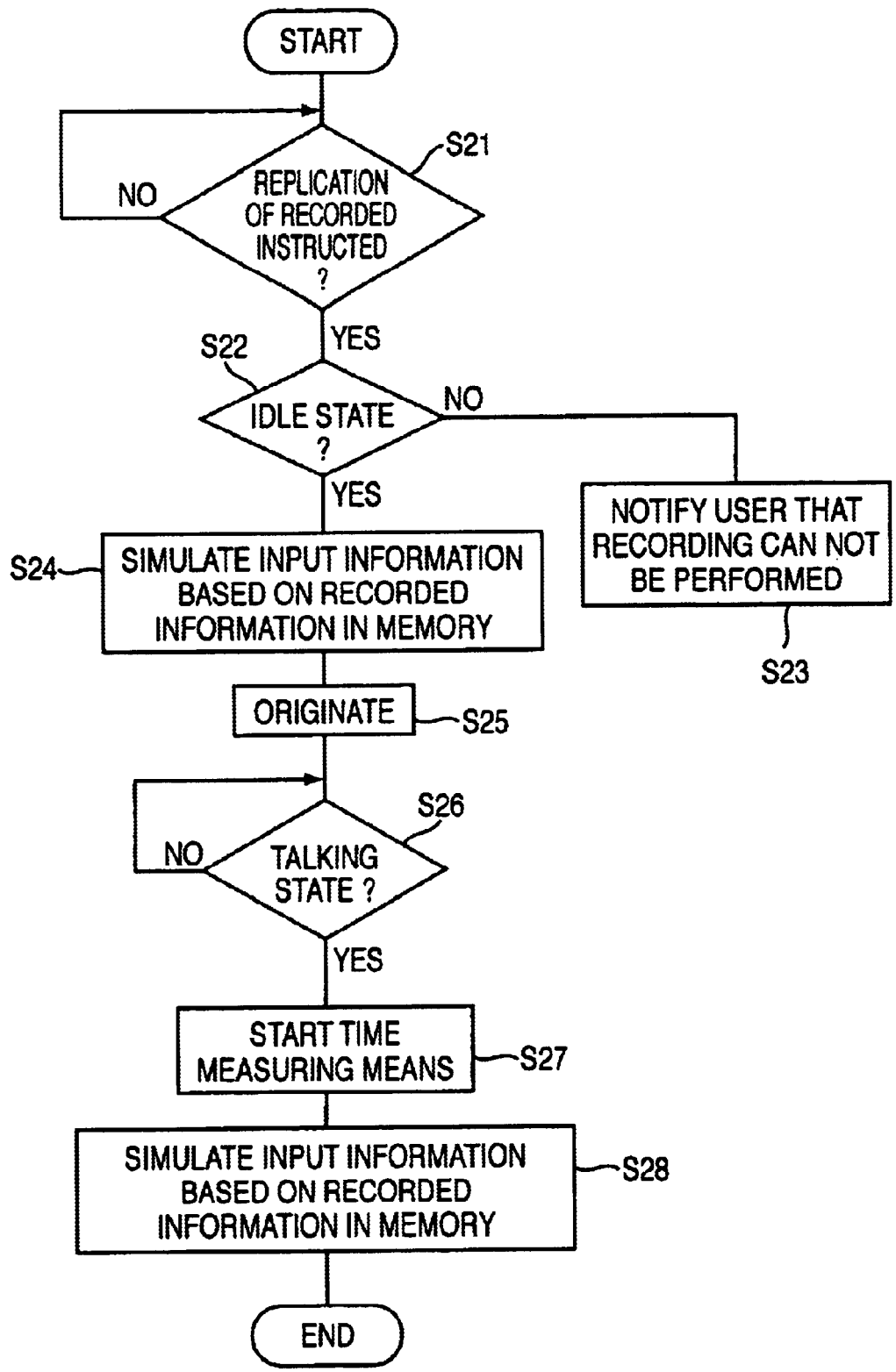
FIG. 6 shows a flow chart of the replicating operation according to the embodiment of the present invention.

Then, the explanation will be made as to the "replicating" method. FIG. 6 shows a flow chart of the replicating operation according to the embodiment of the present invention.

In the replicating method, the operation of the services thus set is simulated based on the information stored in the state recording memory 20. First, in the "idle" state, the replicating operation of the recorded information is started when the replication of the recorded information is instructed (S21). That is, the replicating operation is started either when a specific key for replicating the recorded information is pushed or when the replicating operation of the recorded information for the setting services is selected by using a function key or a menu.

Next, it is confirmed whether or not the radio state is the "idle" state by the radio state acquisition means 12 (S22). In this case, if the radio state is not the "idle" state, a user is notified that the replicating operation of the recorded information can not be performed by using a message display, alarm sound, lighting of an LED etc., and the operation is terminated (S23). In contrast, when it is confirmed that the radio state is the "idle" state, the input information is simulated based on the recorded information stored in the state recording memory 20 (S24) and the status shifts to the "originating" state (S25).

Then, when the radio state is the shifted into "originating" state, the terminal is placed in a standby state until the radio state acquisition means 12 determines that the radio state is the state capable of communicating (S26).

Then, when the radio state is shifted into the "talking" state, the time measuring means 13 is started and operated (S27), and the operation is performed based on the recorded information within the state recording memory 20 (S28). That is, when the recorded information within the state recording memory 20 to be executed is the input interval time information, the control unit does not perform any operation and is placed in the standby state during the interval. In contrast, when the recorded information within the memory to be executed is the input information, the input information is simulated. When the recorded information within the memory is executed completely, it is determined that the setting operation of the services is terminated and the status shifts to the "idle" state.

In the invention, the services capable of being set is required to be ones which can be set only by the key operation and the setting method thereof is required not to be changed frequently.

Further, in the invention, the cellular phone terminal is required to be one such as a portable telephone which has a time measuring means and can measure time accurately.

As described above, according to the invention, the services are set by actually operating the keys, then the input information, the input interval time information and the radio state information upon setting the services is recorded and the contents to be recorded is changed depending on the radio state. Thus, the invention has the following features.

Since the contents to be recorded are changed depending on the radio state, an amount of data to be recorded can be reduced.

Since the service setting method is recorded simultaneously with the actual setting operation of the services, the services can be set surely.

The invention can cope with any services as long as the services are performed merely by operating the keys.

Although there is a case that the service setting method for the same service differs depending on the communication carriers, the invention can cope with such a case.

Further, when the invention is combined with the electric power management function, the invention can be applied to such a case that the power source is automatically turned off after the termination of the service setting operation in the place where the usage of the portable telephone is inhibited.

What is claimed is:

1. A cellular phone terminal capable of setting a specific service by operating keys, said cellular phone terminal comprising:

input means for inputting key-inputted data for setting said specific service;

radio state acquisition means for obtaining a radio state upon setting said specific service;

time measuring means for measuring generation timing of said key-inputted data; and a state recording memory for storing key-inputted data information obtained from said input means, radio state information obtained from said radio state acquisition means and key-inputted data interval information obtained from said time measuring means, in which said key-inputted data information, said radio state information and said key-inputted data interval information are associated with each other.

2. A cellular phone terminal according to claim 1, wherein said radio state is one of an "idle" state, an "originating" state and a "talking" state.

3. A cellular phone terminal according to claim 2, wherein a recording operation is prohibited when said radio state is not said "idle" state.

4. A cellular phone terminal according to claim 1, wherein said information stored in said state recording memory is read in accordance with said radio state thereby to execute said specific service having been set.

5. A cellular phone terminal according to claim 4, wherein a reading operation is prohibited when said radio state is not said "idle" state.

6. A cellular phone terminal according to claim 2, wherein said information stored in said state recording memory is read in accordance with said radio state thereby to execute said specific service having been set.

* * * * *

UNITED STATES PATENT AND TRADEMARK OFFICE
CERTIFICATE OF CORRECTION

PATENT NO. : 6,788,954 B1
DATED : September 7, 2004
INVENTOR(S) : Tadayuki Wantanabe It is certified that error appears in the above-identified patent and that said Letters Patent is hereby corrected as shown below:

<u>Title page, Item [54] and Column 1, line 1,</u>
Title, "CELLULAR PHONE TERMINAL" should be changed to -- CELLULAR TELEPHONE FOR SETTING OPERATIONAL FEATURES USING MANUAL INPUT DATA --

Signed and Sealed this

Twenty-third Day of November, 2004

JON W. DUDAS
*Director of the United States Patent and Trademark Office*